(12) United States Patent
Tsukamoto et al.

(10) Patent No.: US 7,061,852 B2
(45) Date of Patent: Jun. 13, 2006

(54) RECORDING APPARATUS FOR A HOLOGRAPHIC RECORDING MEDIUM INCLUDING AN ALIGNMENT LASER HAVING A DIFFERENT WAVELENGTH FROM THE RECORDING LASER

(75) Inventors: Takayuki Tsukamoto, Kawasaki (JP); Kazuki Matsumoto, Kawasaki (JP); Hideyuki Nishizawa, Tokyo (JP); Akiko Hirao, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 651 days.

(21) Appl. No.: 09/956,972

(22) Filed: Sep. 21, 2001

(65) Prior Publication Data

US 2002/0041561 A1    Apr. 11, 2002

(30) Foreign Application Priority Data

Sep. 29, 2000 (JP) ............................. 2000-301069

(51) Int. Cl.
*G11B 7/00* (2006.01)

(52) U.S. Cl. .................................... 369/103; 369/44.37
(58) Field of Classification Search ................ 369/103, 369/44.37
See application file for complete search history.

(56) References Cited

U.S. PATENT DOCUMENTS

| 4,278,318 | A | * | 7/1981 | Nakayama et al. | ............ 359/25 |
| 4,752,922 | A | * | 6/1988 | MacAnally et al. | ...... 369/30.15 |
| 5,777,760 | A | * | 7/1998 | Hays et al. | ...................... 359/7 |
| 5,978,112 | A | * | 11/1999 | Psaltis et al. | .................. 359/22 |
| 5,982,513 | A | * | 11/1999 | Zhou et al. | .................... 359/22 |
| 6,496,454 | B1 | * | 12/2002 | Nakano | ................... 369/44.37 |

FOREIGN PATENT DOCUMENTS

| JP | 59-019251 | 1/1984 |
| JP | 01-204220 | 6/1989 |
| JP | 04-301226 | 10/1992 |
| JP | 11-219540 | 6/1999 |
| JP | 11-282330 | 10/1999 |
| JP | 11-311936 | 11/1999 |
| JP | 11-311937 | 11/1999 |
| JP | 11-311938 | 11/1999 |

OTHER PUBLICATIONS

Gan Zhou, et al., "Implementation of Holographic Optical Disc", Proceedings of the International Symposium on Optical Memory, 1998, pp. 14-15.

* cited by examiner

*Primary Examiner*—Aristotelis M. Psitos
(74) *Attorney, Agent, or Firm*—Oblon, Spivak, McClelland, Maier & Neustadt, P.C.

(57) ABSTRACT

A recording apparatus for holographic recording medium having an alignment mark and designed to irradiate a recording light beam onto a recording region of holographic recording medium to record information as a hologram. This apparatus comprises a recording laser recording the hologram onto the medium, an alignment laser irradiating an alignment light beam onto the medium, the alignment light beam being less absorbed than the recording light beam by the medium, and being reflected by the medium, a first lens converging the recording light beam and directing it toward the medium, a second lens converging the alignment light beam and directing it toward the medium, a photodetector detecting a light intensity of the alignment light beam reflected from the medium to recognize the alignment mark, and a driving mechanism adjusting a region to be irradiated with the recording light beam relative to the medium based on the alignment mark.

11 Claims, 3 Drawing Sheets

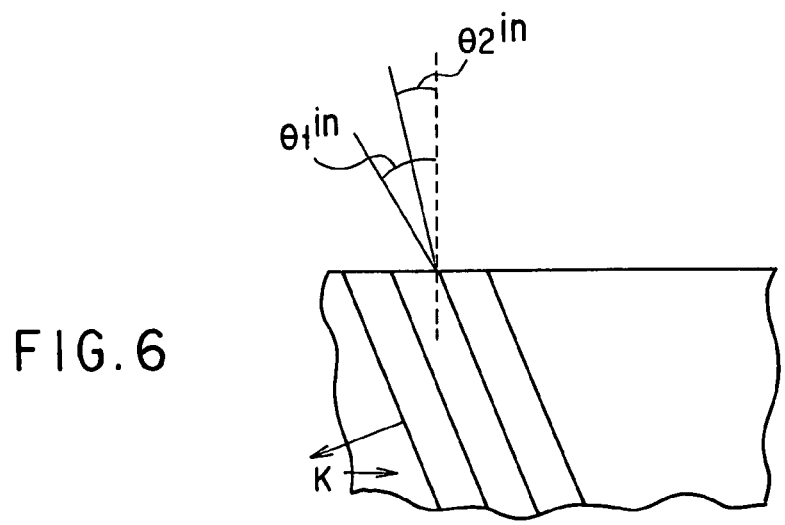
FIG. 6
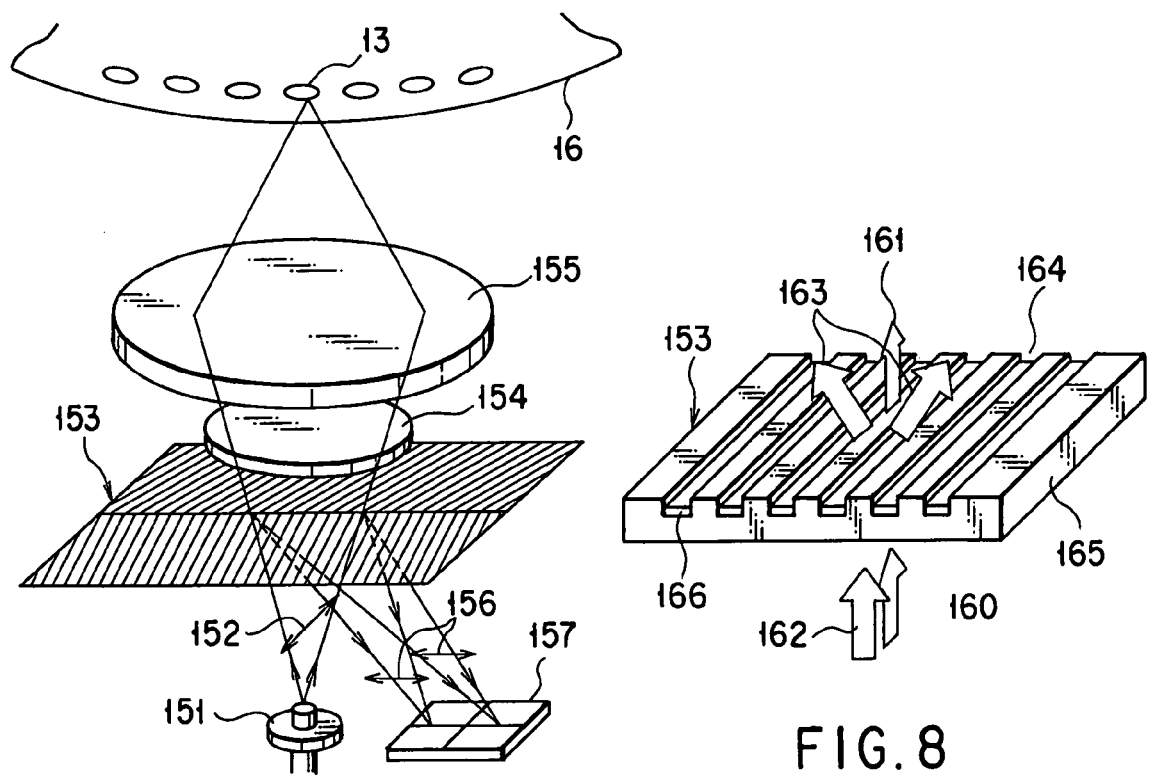
FIG. 7
FIG. 8

RECORDING APPARATUS FOR A HOLOGRAPHIC RECORDING MEDIUM INCLUDING AN ALIGNMENT LASER HAVING A DIFFERENT WAVELENGTH FROM THE RECORDING LASER

CROSS-REFERENCE TO RELATED APPLICATIONS

This application is based upon and claims the benefit of priority from the prior Japanese Patent Application No. 2000-301069, filed Sep. 29, 2000, the entire contents of which are incorporated herein by reference.

BACKGROUND OF THE INVENTION

1. Field of the Invention

This invention relates to an information recording medium for recording information in a three-dimensional photorecording medium, in particular, to a recording medium for recording information in a holographic recording memory.

2. Description of the Related Art

As a recording medium which is capable of recording a large amount of data which requires a large memory capacity such as an image of high density, a photorecording medium is known to be useful. Conventionally, as a photorecording medium, a photomagnetic recording medium and an optical phase change recording medium have been developed. However, there is still increasing demands for an optical recording medium having a capacity for recording a more increased density of information.

There has been proposed a three-dimensional optical recording medium for realizing the recording of such an increased density of information. In this three-dimensional optical recording medium, a signal light beam bearing a plurality of information and a light beam called a reference light beam are simultaneously irradiated as a spatial distribution onto a specimen, thereby enabling the information to be stored as a hologram in the optical recording medium.

In the conventional optical phase change recording medium mentioned above, since the light beam is converged through an objective lens and the information is recorded bit by bit in the light beam spot, the recording capacity is restricted depending on the diameter of light beam. Whereas in the case of the holographic recording using a photochromic material or a photorefractive material, the signal light beam is caused to intersect with a reference light beam emitted coherent to the signal light beam, thereby enabling the information to be stored as a hologram in the recording medium. In this case, a light beam having a spatial distribution in intensity or in phase is employed as the signal light beam, enabling a difference in intensity or in phase at a specific region to be generated corresponding to information. Accordingly, a plurality of information extending two-dimensionally can be recorded as a hologram.

It is possible, according to this holographic recording, to record different holograms at an overlapping region by altering the angle of the signal light beam or reference light beam, or by slightly changing the location to be irradiated with the light beam. As a result, this holographic recording is considered as capable of realizing an extremely large recording capacity which is incomparable to the conventional recording systems.

When it is desired to reproduce the information that has been recorded in the optical recording medium in the form of a hologram, a read-out light beam is impinged against the same region at the same angle as that of the reference light beam. As a result, according to the principle of a hologram, the signal light beam is reproduced, thereby enabling the intensity distribution of the signal light beam thus reproduced to be detected by a split detector such as a CCD.

However, it is required, on the occasion of reading the hologram, to impinge a read-out signal under quite the same conditions as the reference light beam employed in the recording of information. Therefore, it is required to employ a tracking and focusing system for irradiating a light beam from a recording/reading light source onto the same region on the recording medium. There are known the following two systems for realizing this object.

One of these systems is set forth in the publication; "Implementation of Holographic Optical Disc", G. Zhou; A. Pu; O. Ivanova; F. Mok, and D. Psaltis; Proceedings of the International Symposium on Optical Memory (pp. 14–15, 1998). This system is featured in that a signal for alignment is recorded outside the data region. Namely, it is designed such that the intensity of the alignment signal detected by a split detector as a readout light beam is irradiated is calculated at first, and based on this calculation, the timing of taking up a data is determined and at the same time, the tracking is performed. However, since the intensity of a light beam of a hologram thus reproduced becomes gradually weaker as it goes far away from the optical axis in general, it is impossible according to this system to increase the SN ratio.

The other system is featured in that an optical recording medium having a recessed/projected reflection surface is employed. Specifically, there are provided an address region and a data recording region, and a light beam is impinged against the address region, thereby enabling the tracking and focusing to be performed in the same manner as in the case where an ordinary optical disk such as CD (compact disk) or DVD (digital versatile disk) is employed. As for the method of alignment, it is explained in detail in the publication, "Optical Pick-up Head", Y. Hori; M. Kato; Applied Physics Bulletin, Dec. 1999, pp. 1401–1406. However, in contrast with the DVD where the thickness of the recording layer is several nanometers, the thickness of the recording layer in the case of a hologram is as large as about 1 mm. Thus, there is a problem in the case of this hologram that, even if the hologram is recorded centering around the data region, the alignment light beam is diffracted by the hologram that has been recorded therein on an occasion of irradiating the alignment light beam onto the address region.

According to the method of alignment employed in the CD or DVD, the tracking signal and focusing signal are obtained based on the magnitude of broadening of the light beam reflected from the reflection surface of the optical recording medium. Therefore, once the alignment light beam is diffracted by the hologram, it becomes a noise. Accordingly, even if the diffraction efficiency is improved for the purpose of enhancing the SN ratio at the time of data readout, it will lead to an increase of diffraction on the occasion of alignment. As a result, the accuracy of alignment would be deteriorated, and hence the SN ratio cannot be increased at the time of reading the data.

BRIEF SUMMARY OF THE INVENTION

As explained above, since the thickness of the recording layer is several nanometers in the optical phase change recording medium employed at present, the diffraction or scattering of light beams at the recording layer may be more or less disregarded irrespective of if the recording layer is in a crystal state or in an amorphous state. In the case of the recording medium which is designed to be employed in a holographic memory, since the thickness of the recording layer is as thick as 1 mm, once a hologram is recorded in the recording layer, not only the readout light beam but also the alignment light beam are diffracted at this recording layer. Since this phenomenon leads to the generation of noise for the alignment light beam, it is no longer possible to realize a tracking of high precision. Even if it is desired to improve the diffraction efficiency for the purpose of enhancing the SN ratio at the time of data readout, since the alignment light beam is diffracted correspondingly, the noise in the alignment signal would be further increased. As a result, it is impossible to enhance the SN ratio on the occasion of reading the data.

Therefore, an object of this invention is to provide an information recording medium which is capable of recording information in a three-dimensional optical recording medium constituted by a holographic recording medium which is designed to store the information in the form of a hologram, the information recording medium being characterized in that the tracking and focusing of a recording light beam can be accurately achieved.

Namely, according to this invention, there is provided a recording apparatus for a holographic recording medium having an alignment mark and designed to irradiate a recording light beam onto a recording region of holographic recording medium to record information as a hologram, the recording apparatus comprising:

a recording laser irradiating the recording light beam for recording the hologram onto the holographic recording medium;

an alignment laser irradiating an alignment light beam onto the holographic recording medium, the alignment light beam being less absorbed than the recording light beam by the holographic information medium, and being reflected by the holographic recording medium;

a first lens converging the recording light beam irradiated from the recording laser and directing the converged recording light beam toward the holographic recording medium;

a second lens converging the alignment light beam irradiated from the alignment laser and directing the alignment light beam toward the holographic recording medium;

a photodetector detecting a light intensity of the alignment light beam reflected from the holographic recording medium to recognize the aligment mark; and a driving mechanism adjusting a region to be irradiated with the recording light beam relative to the holographic recording medium on the basis of the alignement mark.

According to this invention, there is also provided a recording apparatrs for a holographic recording medium having an alignment mark and designed to irradiate a recording light beam onto a recording region of a holographic recording medium to record information as a hologram; the holographic recording medium having a recessed/projected surface corresponding to a configuration of track of the recording region and being provided on the recessed/projected surface thereof with a reflective layer, and the recording apparatus comprising:

a recoeding laser irradiating the recoeding light beam for recording the hologram onto the holographic recoeding medium;

an alignment laser irradiating an alignment light beam onto the holographic recording medium, the alignment light beam being less absorbed than the recoeding light beam by the holographic information medium, and being reflected by the holographic recording medium;

a first lens converging the recording light beam irradiated from the recording laser and directing the converged recording light beam toward the holographic recording medium;

a second lens converging the alignment light beam irradiated from the alignment laser and directing the alignment light beam toward the holographic recording medium;

a photodetector detecting a light intensity of the alignment light beam reflected from the holographic recording medium to recognize the alignment mark; and a driving mechanism adjusting a region to be irradiated with the recording light beam relative to the holographic recording medium on the basis of the alignment mark.

According to this invention, there is also provided a reproducing apparatus for a holographic recoding medium having an alignment mark and designed to irradiate a reading light beam onto a recording region of holographic recording medium recorded information as a hologram to read the information, the reproducing apparatus comprising:

a reading laser irradiating the reading light beam for reading the hologram on the holographic recording medium;

an alignment laser irradiating an alignment light beam onto the holographic recording medium, the alignment light beam being less absorbed than the reading light beam by the holographic information medium, and being reflected by the holographic recording medium;

a first lens converging the reading light beam irradiated from the reading laser and directing the converged reading light beam toward the holographic recording medium;

a second lens converging the alignment light beam irradiated from the alignment laser and directing the alignment light beam toward the holographic recording medium;

a photodetector detecting a light intensity of the alignment light beam reflected from the holographic recording medium to recognize the alignment mark; and a driving mechanism adjusting a region to be irradiated with the reading light beam relative to the holographic recording medium on the basis of the alignment mark.

BRIEF DESCRIPTION OF THE SEVERAL VIEWS OF THE DRAWING

FIG. 6 is a diagram illustrating an interference fringe formed between a signal beam and a reference beam;

FIG. 7 is a perspective view illustrating the alignment means of information recording apparatus according to one example of this invention; and FIG. 8 is a perspective view illustrating the alignment means of information recording apparatus according to one example of this invention.

DETAILED DESCRIPTION OF THE INVENTION

Figure 1:
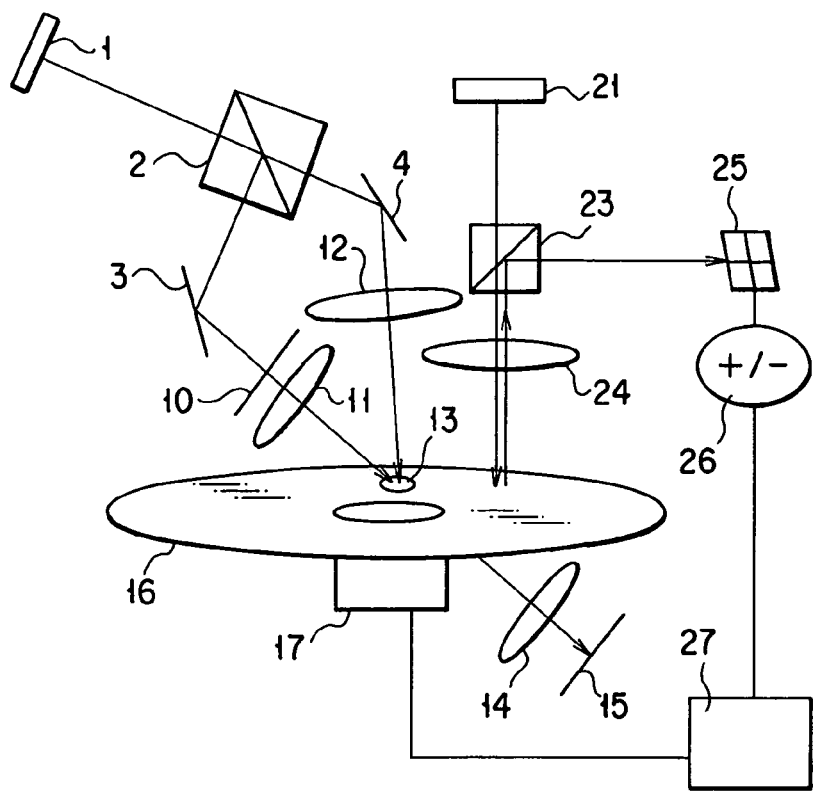
FIG. 1 is a diagram schematically illustrating one example of the construction of the information recording apparatus according to one embodiment of this invention.

Next, this invention will be explained with reference to the following examples.

A holographic recording medium, i.e. a three-dimensional optical recording medium which represents one example of the recording apparatus of this invention and is designed to record information in a form of hologram is provided with a recording layer containing at least a material whose refractive index or absorptivity coefficient can be modulated by the irradiation of a light beam. This recording medium may be constructed according to any kind of technique as long as it is provided with a recording layer containing a material whose refractive index or absorption coefficient can be modulated spatially by the irradiation of a light beam.

For example, it is possible to employ a photorefractive medium provided with a recording layer containing a photorefractive material whose refractive index can be modulated by an internal electric field generated by the redistribution of photo-generated carriers, or a photopolymer medium provided with a recording layer containing a photopolymer material whose refractive index or absorption coefficient can be modulated by an intermolecular reaction or by a reaction inside a molecule due to the irradiation of a light beam.

In particular, the photorefractive medium should preferably be selected from those which make it possible to erase data. Since the photorefractive material is excellent in permeability, a hologram can be stored throughout the entire body of the recording layer. As for specific examples of the photorefractive material, it is possible employ any kind of material as long as it is provided with the aforementioned features. For example, it is possible to employ a material containing fullerene such as $C_{60}$, a phthalocyanine compound, an azo compound, a pyrazoline compound or a naphthalocyanine compound.

Preferably, this recording layer should be constructed such that the material whose refractive index can be modulated by the irradiation of a light beam is dispersed in a matrix material comprising of a transparent polymer such as polystyrene, PMMA, etc.

The three-dimensional optical recording medium for performing the recording and reading of data, which can be employed in the apparatus according to one example of this invention has an alignment mark and may be constructed such that it is provided with a recessed/projected surface corresponding to the configuration of the track of the recording region. The recessed/projected surface may function as the alignment mark. The three-dimensional optical recording medium in this case is provided with a reflective layer having a recessed/projected surface. This reflective layer is designed that the recording light beam can be prevented from being reflected, thereby allowing only the alignment light beam to be reflected. Generally, the width of this recessed/projected portion may be about 1000 nm and the depth thereof may be about 150 nm.

Next, the information recording apparatus according to one example of this invention will be explained.

FIG. 1 schematically illustrates one example of the construction of an information recording apparatus according to one embodiment of this invention.

The light beam emitted from a recording light source 1 is split by suitable means for splitting a light beam such as a beam splitter 2. The light beams split in this manner are allowed to pass via mirrors 3 and 4, and via objective lens 11 and 12 to the recording region 13 of the optical recording medium 16 as shown in FIG. 1, thus irradiating the recording region 13.

The diameter of the light beam emitted from the light source 1 can be expanded by suitable means such as a beam splitter before passing through the objective lens 11 and 12.

For the purpose of modulating the spatial intensity, phase or polarization of a light beam, or any combination thereof, a spatial modulator 10 is disposed on the optical path of one of the split light beams. On the other hand, the light beam emitted from an alignment light source 21 is converged, after passing through a beam splitter 23 and an objective lens 24, onto an optical recording medium 16 as shown in FIG. 1.

In the apparatus shown in FIG. 1, the wavelength of the recording light beam should preferably be shorter than the wavelength of the alignment light beam. It becomes possible, through the selection of a wavelength in this manner, to enhance the carrier-generating efficiency by the recording light beam, thereby making it possible to shorten the recording time. Additionally, the absorption of an alignment light beam can be minimized, thereby making it possible to minimize the generation of noise in the alignment signal, because it makes little changes to the recording layer. Generally, organic substances strongly absorbs light having a wavelength of about 400 nm. Therefore, in order to enable the light beam to reach to the interior of medium without being absorbed, a light having a wavelength which is slightly longer than the wavelength that will be strongly absorbed is employed as a recording light beam. The absorption of the wavelength of the alignment light beam by the medium is smaller then the absorption of the wavelength of the recording light beam. In other words, the medium absorbs the wavelength of the recording light beam than that of the alignment light beam.

The light source useful in this case should preferable be a semiconductor laser. In particular, it is preferable to employ, as the alignment light source 21, a red light having a wavelength of 635 nm or 650 nm, which is usually employed in the DVD. As for the light source for recording a hologram, it is required to employ a coherent light source. Therefore, when a semiconductor laser is employed, the semiconductor laser should preferably be combined with an external resonator. It is also possible to employ, as a recording light beam, a second harmonic generated by an optical guide path. Though it may depend on the kind of recording medium, the wavelength of the recording light beam should preferably be in the range of 400 nm to 650 nm so as to enable the recording medium to suitably absorb the recording light beam. More preferably, the wavelength of the recording light beam should be in the range of 400 nm to 550 nm.

Incidentally, the optical recording medium shown in FIG. 1 may be provided thereon with a recessed/projecting reflective layer (not shown). This reflective layer is designed such that among the light beam irradiated onto the optical recording medium 16, only the recording light beam is permitted to pass therethrough, but the alignment light beam is reflected by the reflective layer. The alignment light beam reflected in this manner is permitted again to pass through the objective lens 24 as shown in FIG. 1. The light beam passed through the objective lens 24 is then introduced via a beam splitter 23 into a split beam detector 25. The intensity of the beam obtained by the split beam detector 25 is calculated by any of the following methods so as to obtain an alignment signal consisting of a tracking signal and a focusing signal.

As for the tracking optical system, it is possible to employ various known methods such as a non-focusing method, Foucaut method, a spot size method, etc. On the other hand, as for the focusing optical system, it is possible to employ various methods such as a 3-beam method, a push-pull method, wobbling method, etc.

Although not shown, in order to full use of the power of the alignment laser 21, a polarized beam splitter can be used as the beam splitter 23. In this case, a proper retardation plate, a λ/4 plate when linearly polarized light source is used as a laser 21, should be placed between the beam splitter 23 and the optical recording medium.

In this case however, it is taken as a matter of course that a difference between the position where the alignment light beam emitted from the alignment light beam source is to be converged as well as the position where the recording light beam is to be converged is already known, so that by measuring the deviation of the alignment light beam, the deviation of the recording light beam can be detected.

On the other hand, when it is desired to reproduce the recorded information, a readout light beam 12 is irradiated onto the recording region 13 so as to obtain a diffracted light beam. This diffracted light beam is then collimated by a lens 14, after which the collimated light beam is detected using a split detector 15 such as a CCD. The position of the objective lens 14 can be adjusted as follows. Namely, the position of objective lens 14 is adjusted in such a manner that the light beam that has passed through the objective lens 14 after passing through a spatial modulator 10, through an objective lens 11 and through the optical recording medium 16 becomes a parallel light beam having a distribution which is analogous with the spatial distribution of the light beam exhibited before it was passed through the objective lens 11. This can be realized by the following arrangement. Namely, the distance between the objective lens 14 and the objective lens 11 is made identical with the sum of the focal lengths of the lens 11 and lens 14. The distance between the spatial modulator 10 and the objective lens is made identical with the focal length of lens 11. Further, the distance between the objective lens 14 and the split detector 15 is made identical with the focal length of the lens 14. Although the optical recording medium 16 can be disposed at any optional position between the lens 11 and the lens 14, the optical recording medium 16 should preferably be disposed close to the focal point of the lens 11.

It is possible in the information recording apparatus constructed as shown in FIG. 1 to reproduce the recorded information having a high SN ratio by the irradiation of a readout light beam.

It is preferable in the information recording apparatus constructed as shown in FIG. 1 that the recording light beam is irradiated parallel with the direction of the track of the three-dimensional optical recording medium.

In this case, the interference fringe to be generated due to the recording light beam may be extended in the direction perpendicular to the direction of track (the lateral direction of track), but would not be extended in the direction of track. Therefore, even if the alignment light beam is diffracted by this interference fringe, the direction of the diffraction would become such that it extends along the direction of track. As a result, the alignment light beam would deviate in the direction of track, so that the adjustment of alignment can be accomplished by simply performing a minute adjustment in the direction of track.

Figure 2A:
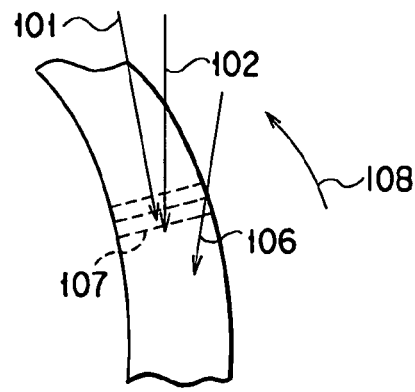
FIGS. 2A to 2C are schematic views, respectively illustrating the relationship between the direction of grooves of the recessed/projected surface of the reflection layer and the irradiation direction of a recording beam.
Figure 2B:
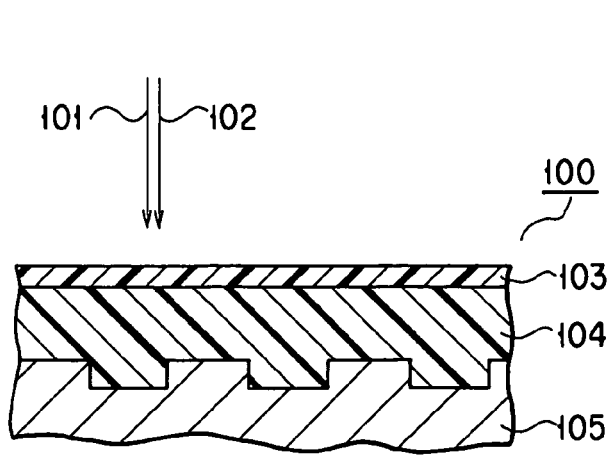
Figure 2C:
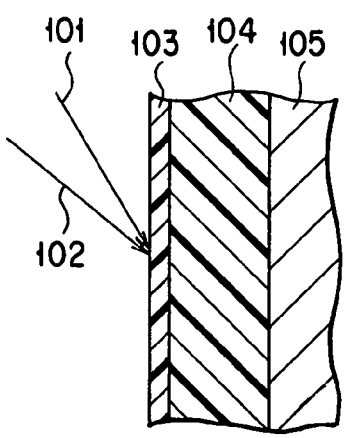

Next, the relationship between the direction of groove of the recessed/projected surface of reflection layer and the irradiation direction of the recording light beam will be explained with reference to FIGS. 2A to 2C. FIG. 2A shows a birds-eye view illustrating the relationship between the groove of the recessed/projected surface of reflection layer and the recording light beam that has been split into two. FIG. 2B shows a cross-sectional view which is perpendicular to the groove of the recessed/projected surface of reflection layer. FIG. 2C shows a cross-sectional view which is parallel with the groove of the recessed/projected surface of reflection layer.

As shown in FIG. 2A, the split recording light beams 101 and 102 will be irradiated onto the recording layer 104 of the three-dimensional optical recording medium (disk) 100. One of these beams is a signal light beam bearing information, while the other is a reference light beam. The light beams 101 and 102 are subsequently intersected with each other in the recording layer, thereby forming an interference fringe 107 and making it possible to perform the recording of information. As shown in FIG. 2A, the medium (disk) 100 is designed to be rotated in the direction of 108, and the recording layer 104 of the medium 100 is designed to be irradiated with the alignment light beam 106 at first, which is followed by a simultaneous irradiation of the recording light beams 101 and 102. The order of irradiating light beams should preferably be such as described above in view of the alignment, but this order may be reversed.

As shown in FIGS. 2B and 2C, the optical recording medium to be irradiated with a signal light beam and a reference light beam is provided on the reflective layer 105 thereof with a recording layer 104 and a protective layer 103, which are successively deposited in the mentioned order.

The reflective layer 105 may be formed of a substrate or a layer, each having a recessed/projected surface. Alternatively, this reflective layer 105 may be a film which is formed along a recessed/projected surface of a supporting substrate or of a supporting layer. The recessed/projected surface of this reflective layer is designed such that the light beam reflected from this layer is the largest when it is properly positioned. When the light beam is designed to be positioned on the recessed portion but is not properly positioned, a part of the beam is reflected from the projected portion and reduces the total intensity of the reflected beam because of the interference when the depth of the recessed/projected surfaces is $\lambda_2/4$ where $\lambda_2$ is the wavelength of the alignment light beam.

A deviation of position along the track can be corrected by adjusting the timing of reading data. For the purpose of minimizing the deviation in the direction perpendicular to the track as mentioned above, it is preferable to record an interference fringe 107 in the direction perpendicular to the track to thereby minimize the diffraction in the direction perpendicular to the track.

In the information recording apparatus according to one example of this invention, the alignment light beam should preferably have little interaction with the recorded grating. More precisely the diffraction of the alignment light beam by the recorded grating should be negligible. The wavelength of light to be emitted from the alignment light beam source should preferably be one where a change in absorption coefficient of the recording layer of the three-dimensional optical recording medium becomes substantially maximum after the recording of hologram.

Figure 3:
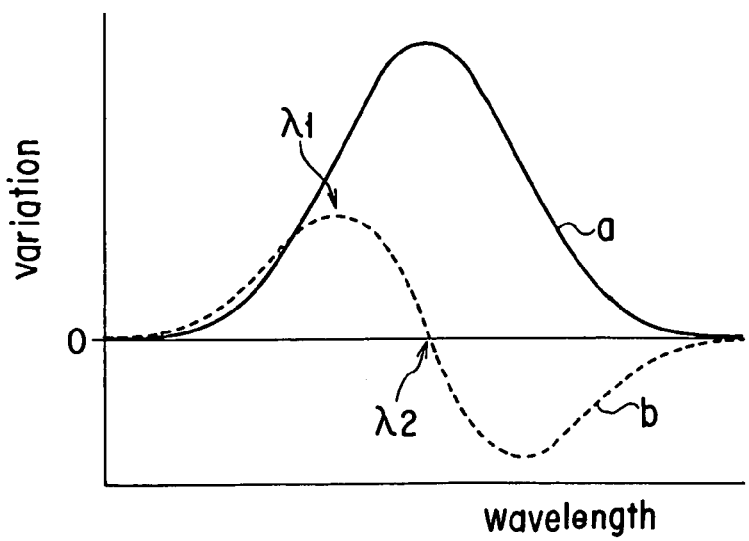
FIG. 3 is a graph wherein the changes of the absorption coefficient and refractive index are expressed as a function of the wavelength.

FIG. 3 is a graph wherein the changes ($\Delta\alpha$) of the absorption coefficient and the changes ($\Delta n$) of the refractive index of the three-dimensional optical recording medium, both changes being brought about due to the generation of an internal electric field, are expressed respectively as a function of wavelength. In FIG. 3, the curve "a" represents the changes ($\Delta\alpha$) of the absorption coefficient, while the curve "b" represents the changes ($\Delta n$) of the refractive index. Since the diffraction efficiency is influenced much more by the change of the refractive index than the change of the absorption coefficient, it is preferable to employ, as the recording light beam, a wavelength in the vicinity of the wavelength $\lambda_1$, and to employ, as the alignment light beam, a wavelength in the vicinity of the wavelength $\lambda_2$.

The wavelength which does not cause a substantial change in the refractive index of the recording layer before and after the recording of a hologram can be measured as explained below.

First of all, by using an objective lens, a white light beam from a mercury lamp is converged in the vicinity of the refractive index-modulating region. On this occasion, the spot size should preferably be as small as possible. Further, in order to prevent the refractive index-modulating region from being erased due to the irradiation of the white light beam, the intensity of white light beam should be sufficiently minimized.

The light beam that has passed through the refractive index-modulating region is permitted to enter into a monochromator so as to sorten the wavelength. Then, the intensity of the light beam is measured as a function of wavelength by a photo multiplier. Thereafter, the ratio between the value thus obtained and the value that has been measured in the same manner before the recording of information is calculated as a common logarithm, thereby making it possible to measure a difference in absorption spectrum before and after the recording. Further, by the relationship of Kramers-Kronig, the difference spectrum of the refractive index is calculated from that of absorption coefficient.

Incidentally, the wavelength $\lambda_2$ at which there is no change of refractive index before and after the recording of a hologram in the optical recording medium will fluctuate depending not only on the kind of material whose refractive index can be modulated by the irradiation of a light beam, but also on the chromophore of the molecule used or quantity of material to be contained in the medium. In other words, the wavelength $\lambda_2$ can be adjusted through the control of these conditions so as to make it identical with the wavelength of the alignment light beam.

Further, in the information recording apparatus according to one example of this invention, a light beam emitted from the recording light beam source is split into two beams, i.e. a signal light beam and a reference light beam, which should preferably be irradiated onto a three-dimensional optical recording medium at an incident angle which makes the alignment light beam impossible to generate a primary diffractive light beam that may be caused due to the interference fringe recorded by these recording light beams. The details related to this feature will be explained hereinafter. When the light beams, i.e. a signal light beam and a reference light beam are irradiated at such an incident angle, it becomes possible to prevent the alignment light beam from being diffracted even if a hologram has been recorded in the medium.

It is preferable in the information recording apparatus of this invention that the objective lens for converging the alignment light beam emitted from the alignment light beam source is formed integral with the objective lens for converging the reference light beam emitted from the recording light beam source. It is better that the objective lens for converging the alignment light beam emitted from the alignment light source is formed integral with the objective lenses for the signal and reference beams emitted from the recording light beam source.

Figure 4:
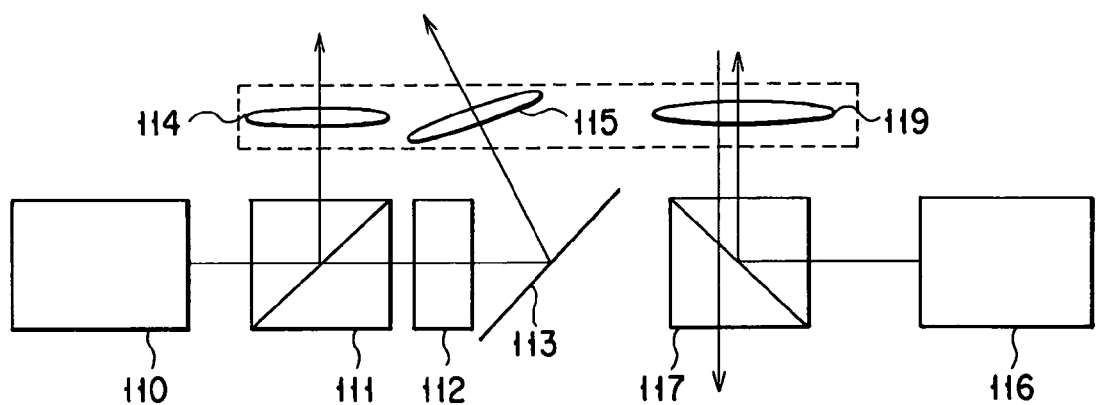
FIG. 4 is a diagram schematically illustrating another example of the construction of an information recording apparatus according to one embodiment of this invention.

FIG. 4 schematically illustrates one example of the construction of an information recording apparatus having an integrated converging means. As shown in FIG. 4, the light beam emitted from a recording light beam source 110 is split into two by means 111 which is designed to split the recording light beam. One of the light beams is transmitted via means 114 which is designed to converge the recording light beam to a recording medium (not shown). The other light beam produced through the splitting is subjected to a spatial intensity/phase modulation by a spatial modulator 112, after which the light beam is further transmitted via a mirror 113 and converging means 115 to a recording medium (not shown).

The light beam emitted from an alignment light beam source 116 is split into two by means 117 which is designed to split the alignment light beam, and then, transmitted via converging means 119 to a recording medium. The light beam that has been reflected by the reflective layer of recording medium is transmitted to a position detecting optical system (not shown).

The means 114 and 115 which are designed to converge a recording light beam and the means 119 which is designed to converge an alignment light beam are integrated as indicated by a broken line in FIG. 4.

When the means for converging a recording light beam and the means for converging an alignment light beam are integrated together in this manner, the relative position of them becomes invariable, thus enabling the alignment of recording/readout light beams to be performed more accurately.

Next, this invention will be further explained in detail with reference to specific examples.

(Preparation of an Optical Recording Medium)

First of all, an optical recording medium was manufactured as explained below.

Fullerene ($C_{70}$), the compound represented by the following chemical formula (1), the compound represented by the following chemical formula (2) and polystyrene were mixed at ratios of 0.5:30:10:59.5 (based on weight) and dissolved in toluene to a solution, which was left to stand a whole day and night in a cooled dark room.

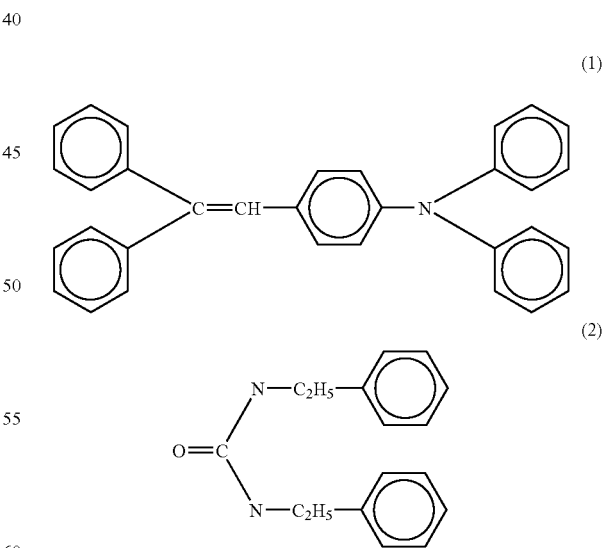

On the other hand, a glass substrate having a recessed/projected surface and a diameter of 5 cm was prepared. Then, a reflective layer was formed on this recessed/projected surface, and an ITO (Indium Tin Oxide) film was further deposited thereon. This reflective layer was featured such that a recording/readout light beam was permitted to pass therethrough, but an alignment light beam was reflected therefrom. For example, the reflective layer was formed of a dielectric multi-layer. The dimension of the recessed/projected surface were 1000 nm in width and 150 nm in depth.

On the other hand, another glass substrate having a flat surface was prepared, and the ITO film was deposited on the flat surface of the glass substrate.

Then, the aforementioned solution which had been left to stand was coated on the ITO film of the glass substrate bearing the reflective layer, and this glass substrate was heated from the back side thereof at a temperature of 80° C. for 3 hours by a heater. As a result, the toluene was allowed to evaporate, thereby forming a recording layer.

Further, a transparent substrate was heated at a temperature of 140° C., and then, a spacer having a thickness of 100 μm was placed on the surface of the substrate, after which the aforementioned ITO film-attached glass substrate was superimposed face to face on the transparent substrate. On this occasion, the glass substrate was disposed in such a manner that the ITO film was contacted with the recording layer. This composite body comprising these transparent substrates was pressed under a uniform pressure so as to allow the recording layer to be uniformly extended, thereby forming a recording layer having a thickness of 100 μm.

Then, for the purpose of effecting the orientation of molecules, an electric voltage of 1.2 kV was applied between these transparent substrates at a temperature of 80° C. and left to stand under this condition for one hour. Thereafter, while applying an electric field to these substrates for 30 minutes, this sample was left to stand, after which the entire body was allowed to cool down to room temperature.

Figure 5A:
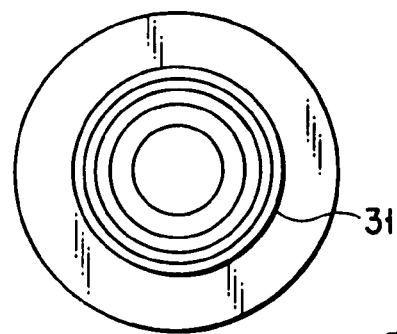
FIGS. 5A and 5B respectively show schematic views illustrating the construction of a three-dimensional optical recording medium that has been manufactured in one example of this invention.
Figure 5B:
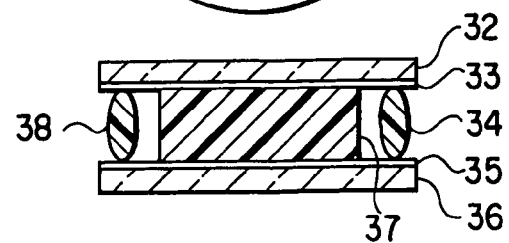

The construction of the optical recording medium thus obtained is schematically shown in FIGS. 5A and 5B. FIG. 5A is a plan view thereof, clearly showing the existence of the recessed/projected reflective layer 31. In this FIG. 5A, the recessed/projected portion is shown concentrically. However, the recessed/projected portion may be spiral in configuration. FIG. 5B is a cross-sectional view thereof, showing a structure wherein spacers 34 and 38, and a recording layer 37 are interposed between a glass substrate 32 bearing an ITO film 33 and a glass substrate 36 bearing an ITO film 35.

(Construction of Information Recording Apparatus)

The information recording apparatus of the optical recording medium according to this example will be explained with reference to FIG. 1.

The light beam emitted from the light beam source 1 is split by beam-splitting means such as the beam splitter 2, and then, allowed to pass through the objective lens 11 and 12 as shown in FIG. 1. A spatial modulator 10 comprising a liquid crystal for giving a spatial intensity modulation to a light beam is interposed between the beam splitter 2 and the objective lens 11. The distance between the objective lens 11 and the recording region 13 is identical with the focal length of the objective lens 11. The distance between the objective lens 12 and the recording region 13 is 1.5 times as long as the focal length of the objective lens 12. Alternatively, the objective lens 11, the objective lens 12 and the optical recording medium 16 may be arranged along the irradiation path in such a manner the diameter of the signal light beam and of the reference light beam to be impinged against the optical recording medium 16 becomes 30 μm.

The objective lens 11 and 12 are adjusted in their directions in such a manner that their optical axes which have been converged intersect in the recording layer of the optical recording medium 16. Further, a difference between the length of the optical path of the light beam emitted from the light beam source and passing through the objective lens 11 and the length of the optical path of the light beam passing through the objective lens 12 is shorter than the coherent length of the light beam source.

The objective lens 14 is adjusted in such a manner that the light beam that has passed through the optical recording medium 16 after being converged by the objective lens 11 comes out with an intensity and phase distribution which is analogous with that of the light beam entering the objective lens 11. The light beam that has been turned into a parallel light beam by the objective lens 14 is detected by a split light beam detector 15 such as a CCD camera. In this case, the distance between the objective lens 11 and the spatial modulator 10 is identical with the focal length of the objective lens 11. Further, the distance between the objective lens 14 and the split light beam detector 15 should preferably be identical with the focal length of the objective lens 14. It is also preferable that the distance between the objective lens 11 and the objective lens 14 is identical with a total of the focal lengths of these objective lenses.

The optical recording medium 16 is designed to be driven by a driving device 17, thereby enabling it to be rotated and shifted parallel in a three-dimensional direction.

On the other hand, the light beam emitted from the alignment light beam source 21 is passed through a beam splitter 23, converged at the objective lens 24, and irradiated perpendicularly onto the optical recording medium 16. This optical recording medium 16 is provided with a groove to thereby make it possible to identify in advance the direction of the radius vector. The surface of the groove is covered with a dielectric multi-layer which permits the permeation of a recording/readout light beam, but reflects the alignment light beam.

The light beam reflected by the optical recording medium 16 is permitted again to pass through the objective lens 24, entering from the opposite side thereof this time, after which the light beam is reflected by the beam splitter 23 and transmitted to a tracking optical system and a focusing optical system (not shown). As for these tracking optical system and focusing optical systems, there is not any particular restriction.

Alternatively, by a holographic optical element, an optical system can be easily designed.

By the optical system shown in FIG. 1, the method of irradiating the alignment light beam, the distance between the objective lens 11 and the optical recording medium, and the distance between the objective lens 12 and the optical recording medium were adjusted as follows so as to perform the recording and readout of information.

The alignment means using a holographic optical element will be explained with reference to FIG. 7 and FIG. 8. The light beam emitted from the alignment light beam source 151 is designed to be polarized at 152. As indicated by a reference numeral 153, HOE is designed such that the polarized light beam in the direction of 160 (the same direction as that of 152) is permitted to pass therethrough, and the polarized light beam in the direction of 162 which is perpendicular to the direction of 160 is diffracted. On this occasion, the light beam emitted from the light beam source 151 is allowed to pass through the HOE, and a λ/4 plate 154, and to be converged by the objective lens 155 before it is finally irradiated onto the optical recording medium 16.

The light beam reflected by the optical recording medium is allowed to pass via the objective lens 155 and the λ/4 plate 154 to the HOE 153. Since the polarization direction 156 is perpendicular to the direction 152, the light beam is diffracted by the HOE 153 and hence transmitted toward the optical detector 157. The intensity of the beam detected by the optical detector 157 is calculated to determine the focusing signal and tracking signal, whereby the alignment thereof is performed by the driving device 17.

It is assumed in this case that the deviation in a three-dimensional direction between the focus position on which the alignment light beam emitted from the alignment light beam source is converged, and the focus position of the recording/readout light beam is identified in advance. Further, the alignment light beam emitted from the alignment light beam source 21 may be always or intermittently irradiated onto the optical recording medium 16. Whereas, the light beam (signal light beam) emitted from the recording/readout light beam source 1 and permeated through the spatial modulator 10 should be controlled in such a manner that it is shielded and hence not irradiated onto the optical recording medium 16 except on the occasion of recording information.

(Recording of Information)

By the information recording apparatus shown in FIG. 1, a hologram was recorded in the optical recording medium which was manufactured as mentioned above.

First of all, by the driving device 17, the focus of the recording/readout light beam was adjusted so as to position it at an innermost side of the recording region 13 of the optical recording medium 16. Thereafter, on the basis of the tracking signal and focusing signal which were obtained from the alignment optical system, the position of the optical recording medium 16 was finely adjusted.

After the state of the spatial modulator 10 was adjusted so as to obtain an intensity distribution of permeating light beam corresponding to the information to be recorded, the recording light beam was irradiated for a predetermined period of time. Then, the optical recording medium 16 was rotated by the driving device 17 so as to allow the recording light beam to be irradiated at a different recording region. Subsequently, after the state of the spatial modulator 10 was adjusted so as to conform it with the information desired to be recorded, the recording light beam was again irradiated for a predetermined period of time.

By repeating the same procedures as described above, data can be successively recorded along the direction of the track.

(Readout of Information)

Next, using the information recording apparatus shown in FIG. 1, the readout of information which was recorded in the optical recording medium was performed.

First of all, by the driving device 17, the focus of the objective lens 12 was adjusted so as to position it at an innermost periphery of the recording layer of the optical recording medium 16. Thereafter, on the basis of the tracking signal and focusing signal which were obtained from the alignment optical system, the position of the optical recording medium 16 was finely adjusted.

More precious adjusting of the position in the direction of the track can be carried out as follows. The light beam passing through the objective lens 12 was irradiated onto the optical recording medium 16, thereby adjusting the position of the direction of track. The adjustment of the position of the direction of track can be performed by the procedures described in a publication, "Implementation of Holographic Optical Disc", G. Zhou; A. Pu; O. Ivanova; F. Mok, and D. Psaltis; Proceeding of the International Symposium on Optical Memory (pp. 14–15, 1998). As a result, it was possible to confirm that the readout light beam was correctly focused.

More specifically, a window is positioned outside the data readout region on the occasion of irradiating the readout light beam, and when a pit reached this window, it is considered that the readout light beam has been correctly focused. By measuring the diffracted readout light beam by the split optical detector 15 such as CCD, information can be read out at a high SN ratio.

In particular, as already explained with reference to FIGS. 2A to 2C, when the optical axis of the light beam that has been converged by the objective lens 11 and 12 is parallel with the direction of track, the alignment of recording/readout light beam can be accurately performed.

Further, as already explained with reference to FIG. 3, if the wavelength of alignment light beam is selected from those at which there is no change in refractive index of the optical recording medium before and after the recording of a hologram, the alignment of a recording/readout light beam can be accurately performed.

Further, in the information recording apparatus constructed as shown in FIG. 1, a light beam emitted from the recording light beam source is split into two beams, i.e. a signal light beam and a reference light beam. These light beams should preferably be irradiated onto a three-dimensional optical recording medium at an incident angle which makes it impossible to generate a first order diffraction of the alignment beam. Specifically, when the line interconnecting the center of the objective lens 11 and 12, and the center of the recording region 13 is assumed to be intersected with the surface of the three-dimensional optical recording medium 16 at angles of θ1 and θ2, respectively, the following conditions should preferably be satisfied. If these conditions are satisfied, it becomes possible to further minimize the noise on the occasion of obtaining the tracking signal and the focusing signal.

In this case, the refractive index of the recording layer is represented by n, the wavelength of light beams emitted from the recording/readout and alignment light beam sources are represented by $\lambda_1$ and $\lambda_2$ respectively. The relationship involved in this case will be explained with reference to FIG. 6.

Although the recording of a hologram is performed by converging a laser beam before it is irradiated, it is assumed in this case that a parallel light beam passing through the optical axis is irradiated onto an optical recording medium. Under this assumption, the conditions which would not cause the diffraction of an alignment light beam even if hologram has been recorded therein will be determined as follows.

A light beam emitted from the recording light beam source is split into two of beams, i.e. a signal light beam and a reference light beam, and when these light beams are irradiated to and intersected with each other in a three-dimensional optical recording medium, an interference fringe is caused to generate. In this case, when the incident angle of a signal light beam as measured outside the optical recording medium is assumed as being θ1, the incident angle $\theta 1^{in}$ of a signal light beam as measured inside the optical recording medium becomes: n sin $\theta 1^{in}$=sin θ1. In the same manner, since n sin $\theta 2^{in}$=sin θ2 can be established for the reference light beam also, the incident angle as measured inside the optical recording medium can be determined. The wave number vector of the interference fringe to be formed in this case can be determined by the following numerical formula (1).

$$\vec{k} = \vec{k_1} - \vec{k_2} = \frac{2\pi}{\lambda 1/n} \begin{pmatrix} \sin\theta 1^{in} - \sin\theta 2^{in} \\ 0 \\ \cos\theta 1^{in} - \cos\theta 2^{in} \end{pmatrix} \quad \text{numerical formula (1)}$$

Under the conditions where the alignment light beam is irradiated perpendicular to the interference fringe in this manner, the diffraction can be most strongly generated when the value θ0 which is capable of satisfying the following numerical formula (2) is exists.

$$\frac{\Lambda}{\sin\theta K} + \frac{\Lambda}{\sin\theta O} = \lambda 2/n \quad \text{numerical formula (2)}$$

wherein, $$\Lambda = \frac{2\pi}{|\vec{k}|}$$

is the period of the grating.

Therefore, the condition where a direction which strongly diffracts the alignment light beam does not exist will be represented by the following numerical formula (3).

$$\frac{1}{\sin\theta O} = \frac{\lambda 2/n}{\Lambda} - \frac{1}{\sin\theta K} \quad \text{numerical formula (3)}$$
$$= \left(\frac{\lambda 2}{\lambda 1} - \frac{1}{\cos\theta 2^{in} - \cos\theta 1^{in}}\right)*$$
$$= \sqrt{2 - 2\cos(\theta 2^{in} - \theta 1^{in})} < 1$$

When this condition is met, the alignment light beam would not be interfered with even if a hologram is recorded in the medium, thereby making it possible to greatly minimize the noise to be generated on the occasion of obtaining a tracking signal and a focusing signal.

This invention is not limited to the aforementioned examples or embodiments. For example, the alignment light beam may be permitted to pass through the medium, this permeated light beam being subsequently detected so as to perform the alignment. Additionally, this invention may be variously modified without departing from the merit of this invention.

As explained above, it is provided, according to this invention, an information recording medium for recording information in a three-dimensional photorecording medium, the information being recorded in the form of a hologram, which is featured in that the tracking and focusing of a recording light beam can be accurately achieved. It is now possible through the employment of an information recording apparatus of this invention to greatly improve the SN ratio on the occasion of reading data from the three-dimensional photorecording medium, and therefore, this invention will be very valuable from an industrial viewpoint.

Additional advantages and modifications will readily occur to those skilled in the art. Therefore, the invention is its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording apparatus for a holographic recording medium having an alignment mark and designed to irradiate a recording light beam onto a recording region of holographic recording medium to record information as a hologram, the recording apparatus comprising:
   a recording laser irradiating the recording light beam for recording the hologram onto the holographic recording medium;
   a beam splitter splitting the recording light beam into two beams, one of which is utilized as a reference light beam;
   a spatial modulator providing information to the other beam obtained from the splitting to obtain a signal light beam;
   a first lens converging the reference light beam and directing the converged reference light beam toward the holographic recording medium;
   a second lens converging the signal light beam and directing the converged signal light beam toward the holographic recording medium;
   an alignment laser irradiating an alignment light beam perpendicularly onto the holographic recording medium, the alignment light beam being less absorbed than the recording light beam by the holographic recording medium, and being reflected by the holographic recording medium;
   a third lens converging the alignment light beam irradiated from the alignment laser and directing the alignment light beam toward the holographic recording medium;
   a photodetector detecting a light intensity of the alignment light beam reflected from the holographic recording medium to recognize the alignment mark; and
   a driving mechanism adjusting a region to be irradiated with the signal light beam and the reference light beam relative to the holographic recording medium on the basis of the alignment mark,
   wherein the signal light beam and the reference light beam are irradiated parallel with a track of the holographic recording medium to write an interference fringe in a direction perpendicular to the track of the recording region.

2. The recording apparatus for a holographic recording medium according to claim 1, wherein the holographic recording medium has a recessed/projected surface corresponding to a configuration of the track of a recording region and is provided on the recessed/projected surface thereof with a layer which reflects the alignment beam.

3. The recording apparatus for a holographic recording medium according to claim 1, wherein said third lens converging the alignment light beam to be irradiated from the alignment laser is formed integral with the first lens converging the reference light beam to be irradiated from the recording laser.

4. The recording apparatus for a holographic recording medium according to claim 1, wherein said third lens converging the alignment light beam to be irradiated from the alignment laser is formed integral with the first lens converging the reference light beam to be irradiated from the recording laser and with the second lens converging the signal light beam to be irradiated from the recording laser.

5. The recording apparatus for a holographic recording medium according to claim 1, wherein the wavelength of the recording light beam is shorter than the wavelength of the alignment light beam.

6. A recording apparatus for a holographic recording medium having an alignment mark and designed to irradiate a recording light beam onto a recording region of a holographic recording medium to record information as a hologram, the recording apparatus comprising:
- a recording laser irradiating the recording light beam for recording the hologram onto the holographic recording medium;
- a beam splitter splitting the recording light beam into two beams, one of which is utilized as a reference light beam;
- a spatial modulator providing information to the other beam obtained from the splitting to obtain a signal light beam;
- a first lens converging the reference light beam and directing the converged reference light beam toward the holographic recording medium;
- a second lens converging the signal light beam and directing the converged signal light beam toward the holographic recording medium;
- an alignment laser irradiating an alignment light beam perpendicularly onto the holographic recording medium, the alignment light beam being less absorbed than the recording light beam by the holographic recording medium, and being reflected by the holographic recording medium;
- a third lens converging the alignment light beam irradiated from the alignment laser and directing the alignment light beam toward the holographic recording medium;
- a photodetector detecting a light intensity of the alignment light beam reflected from the holographic recording medium to recognize the alignment mark; and
- a driving mechanism adjusting a region to be irradiated with the signal light beam and the reference light beam relative to the holographic recording medium on the basis of the alignment mark,
- wherein the signal light beam and the reference light beam are irradiated onto the holographic recording medium at an incident angle making it impossible to generate a primary interference of the alignment light beam.

7. The recording apparatus for a holographic recording medium according to claim 6, wherein the signal light beam and the reference light beam are irradiated onto the holographic recording medium in a condition represented by the following numerical formula:

$$\left(\frac{\lambda 2}{\lambda 1} - \frac{1}{\cos\theta 2^{in} - \cos\theta 1^{in}}\right) * \sqrt{2 - 2\cos(\theta 2^{in} - \theta 1^{in})} < 1$$

wherein $\lambda_1$ and $\lambda_2$ are wavelengths of the recording light beam and alignment light beam, $\theta 1^{in}$ is an incident angle of the signal light beam to the surface of the recording region of the holographic recording medium, and $\theta 2^{in}$ is an incident angle of the reference light beam to the surface of the recording region of the holographic recording medium.

8. The recording apparatus for a holographic recording medium according to claim 6, wherein the holographic recording medium has a recessed/projected surface corresponding to a configuration of the track of a recording region and is provided on the recessed/projected surface thereof with a layer which reflects the alignment beam.

9. The recording apparatus for a holographic recording medium according to claim 6, wherein said third lens converging the alignment light beam to be irradiated from the alignment laser is formed integral with the first lens converging the reference light beam to be irradiated from the recording laser.

10. The recording apparatus for a holographic recording medium according to claim 6, wherein said third lens converging the alignment light beam to be irradiated from the alignment laser is formed integral with the first lens converging the reference light beam to be irradiated from the recording laser and with the second lens converging the signal light beam to be irradiated from the recording laser.

11. The recording apparatus for a holographic recording medium according to claim 6, wherein the wavelength of the recording light beam is shorter than the wavelength of the alignment light beam.

* * * * *